United States Patent [19]

Bertleff

[11] Patent Number: 5,302,105
[45] Date of Patent: Apr. 12, 1994

[54] METHOD FOR REPLACING A MOLD BLOCK IN AN INJECTION MOLDING MACHINE

[75] Inventor: Wolfgang Bertleff, Pegnitz, Fed. Rep. of Germany

[73] Assignee: Mannesmann Aktiengesellschaft, Dusseldorf, Fed. Rep. of Germany

[21] Appl. No.: 882,326

[22] Filed: May 13, 1992

[51] Int. Cl.$^5$ .................................... B29C 45/66
[52] U.S. Cl. .................... 425/190; 425/574; 425/575
[58] Field of Search ............... 425/185, 186, 190, 574, 425/575

[56] References Cited

U.S. PATENT DOCUMENTS

| | | | |
|---|---|---|---|
| 4,529,371 | 7/1985 | Nickley | 425/186 |
| 4,698,007 | 10/1987 | Hehl | 425/190 |
| 5,096,404 | 3/1992 | Janos et al. | 425/190 |

*Primary Examiner*—Tim Heitbrink
*Attorney, Agent, or Firm*—Cohen, Pontani, Lieberman, Pavane

[57] ABSTRACT

A method for changing of mold blocks on an injection molding machine, in which the mold block can be clamped in a centered position between a movable clamping plate and a fixed clamping plate and, for replacement of the mold, can be moved out of the machine parallel to the clamping surface. Upon the installation of the mold, the mold block is initially substantially restricted in its freedom of movement in the open condition of the clamping plates, in the direction of the center axis and in a direction perpendicular vertically or horizontally thereto. After being restricted in movement, the mold block is gripped from the outside in the direction of the center axis of the injection molding machine in order to avoid possible tilting movements towards the clamping plate and is held in a vertical position with the avoidance of possible tilting movements in the direction of the center axis of the injection molding machine during the movement towards each other of the clamping plates for clamping the mold block. The mold block, shortly before its final clamping by the clamping plates, is centered in the proper operating position.

2 Claims, 4 Drawing Sheets

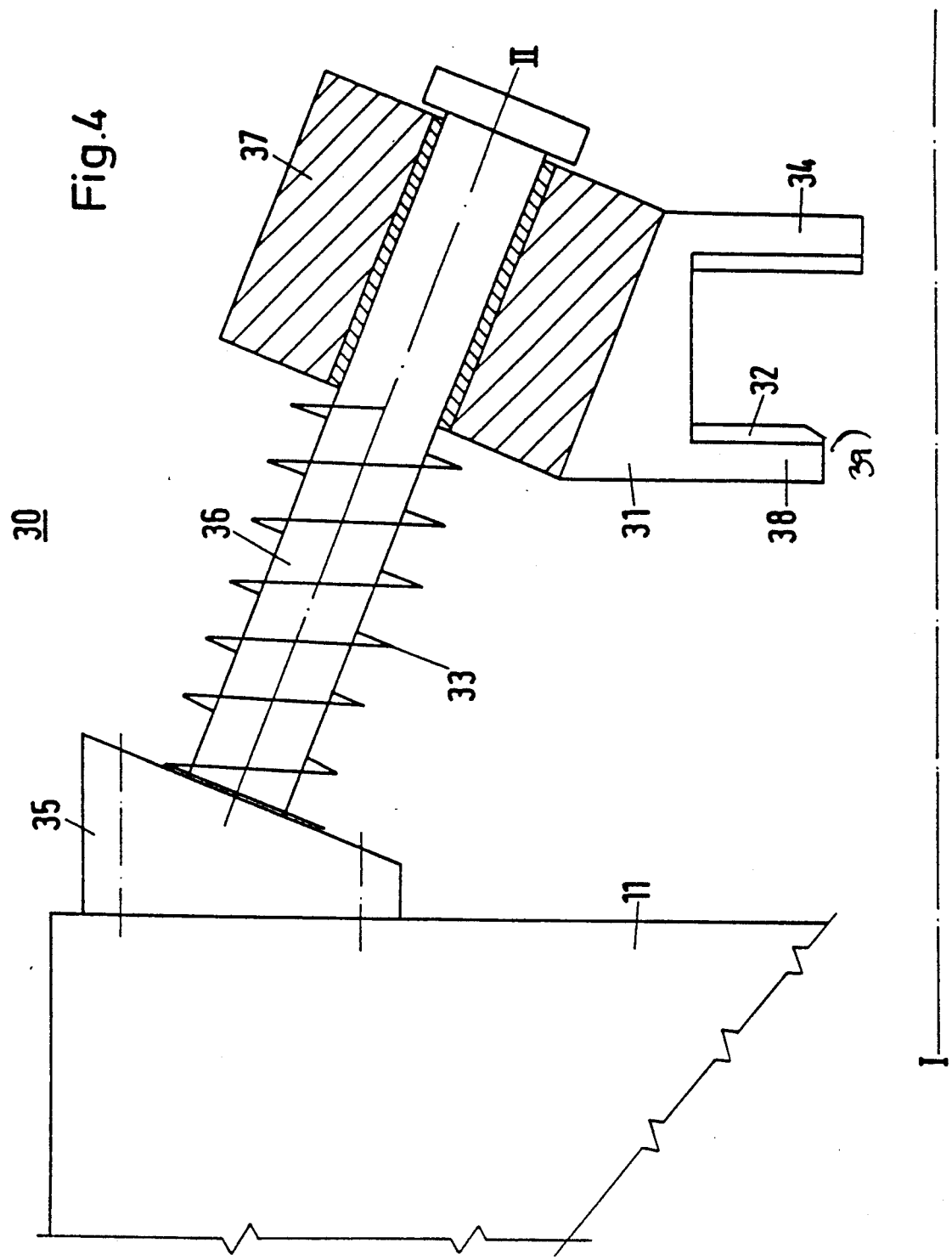

METHOD FOR REPLACING A MOLD BLOCK IN AN INJECTION MOLDING MACHINE

FIELD OF THE INVENTION

The present invention relates to a method and a device for replacing a mold on an injection molding machine, in which the mold block can be clamped centered between a movable clamping plate and a fixed clamping plate during molding and can be moved out of the machine parallel to the clamping surface for mold replacement.

BACKGROUND OF THE INVENTION

Injection molding machines of the above-described type have mold clamping plates between which a mold block can be clamped. Upon installation and removal of the mold, the clamping plates are closed and opened. As long as plate contact is not present, the mold tends to undesirably twist or tilt. In particular, upon installation, the mold must be introduced between the clamping plates, carefully centered and held there without any change in position except in the direction of movement. In addition to this, a dependable coupling of the power lines should be possible at minimum expense.

From Federal Republic of Germany Patent Document No. DE OS 38 36 986, an injection molding machine is known which has an injection mold with a mold resting plate, the lower edge of which rests on horizontal axis rollers of the mold receiver, and the side edges of which rest on a lateral stop of the mold receiver.

The embodiment of DE OS 38 36 968 has the disadvantage of requiring a time-consuming and difficult maneuvering of the mold resting plate into the guide. In addition, the relatively complex construction of the guide results in a structure which has such a large amount of play which prevents a precise alignment, and allows tilting and twisting of the mold.

European Patent Document No. EP A1 0 314 794, relates to a device with motor-driven clamping wedges which are movable perpendicular to the center axis and act on the mold on the resting plate. The slide surface of the wedges and of the resting plate face in the direction of the clamping plate away from the central axis. By the positioning and dimensioning of the surfaces, however, only a rough centering of the mold block is possible.

SUMMARY AND OBJECTS OF THE INVENTION

It is an object of the present invention to address the problem of effecting an easy, partially or completely automated replacement of the mold, of a mold in a molding apparatus, in which the mold is held in a defined orientation in the desired position during every phase of the replacement operation.

This object is achieved according to the present invention by providing a method for changing the mold blocks on the injection molding machines in which the mold block can be clamped, centered between a movable clamping plate and a fixed clamping plate and, for replacement of the mold, can be moved out of the machine parallel to the clamping surface, wherein upon installation of the mold, the mold block in an initial operation phase is substantially constricted in its freedom of movement during an open condition of clamping plates in two planes, namely in the direction of the central axis of the injection molding machine and an axis vertically or horizontally perpendicular thereto, that in a second operation phase, the mold block is gripped from the outside in the direction of the central axis in in order to avoid potential tilting movements towards the clamping plate, and is held in a vertical position while avoiding possible tilting movements in the direction of the central axis of the injection molding machine during the converging movement of the clamping plates, and that the mold block, shortly before its final clamping by the plates, is properly centered.

The present method preferably includes the step of simultaneously gripping the outside of the mold block and centering of the mold block before the final clamping by the clamping plates. Further, during the horizontally centered movement of clamping plate and mold block, it is preferable that the mold block be simultaneously guided slidingly in a vertical direction.

The present method also preferably releases the grip on the mold block by a movement directed in the direction of the clamping plate, outward from the mold block.

The present invention also provides an injection molding machine with a movable clamping plate and a fixed clamping plate, between which a mold block having replaceable mold resting plates can be centered and clamped by the method of the present invention, wherein provided on the stationary clamping plate is at least one gripper which has a guide claw which surrounds the edge of the resting plate of the mold block with a shorter flank of the guide claw facing the clamping plate, and that the gripper has a linear axis of movement in a direction which faces substantially in the direction of the fixed clamping plate and away from the center axis. The guide claw has a pair of opposed parallel surfaces, arranged generally normal to the center axis of the machine. Therefore, as a plate-shaped object is moved from a position distant from the clamping plate toward it, the claw will gradually disengage, allowing another guiding mechanism to take over the guidance. Because the surface closer to the clamping plate ends at a position more distal to the center axis than the further surface, the shorter, closer surface will disengage first, thereby allowing a portion of the longer surface to maintain a force on the plate-shaped object during the final stages of positioning.

The injection molding machine preferably has a gripper which can be moved into a position in which the shorter flank end surfaces are arranged perpendicular to the outside of the stationary clamping plate, permitting a sliding friction. The mouth of the guide claw preferably has introduction bevels, and is preferably arranged on a slide piece through which a bolt can be slidably guided. The guide bolt is preferably arranged at an angle of about 10° to about 25° to the center axis. This orientation, which is neither parallel, nor perpendicular to the center axis, provides a relative outward displacement of the claw while the mold block approaches the clamping plate, thereby releasing the claw and allowing the centering device of the clamping plate to finally maintain the orientation of the mold block. A compression spring is preferably provided between the mounting plate of the guide bolt and the slide pieces.

According to the present invention, the mold resting plate of the mold is introduced into at least one guide claw. This guide claw engages the mold resting plate in a form-locked manner, i.e. through a mechanical interference fit, and holds it in a defined position parallel to the clamping plate during the axial movement of the mold. This dependable gripping is retained until centering elements provided on the mold come into engagement with centering holes provided on the machine. The form-lock between the guide claw and mold resting plate is terminated and the contacting of the plate can then take place directly. The loosening of the grip of the guide claw on the mold resting plate is achieved by a displacement shaft which is inclined with respect to the direction of movement of the mold and on which the guide claw is shifted perpendicular to the center axis, simultaneously with the movement of the mold. By incorporation of flanks having differing lengths, detachment of the resting plate from the guide claw is simply accomplihed. There is pure positive guidance so that no control and no end-position detection are necessary.

Another advantage of the present invention is that the power supply couplings are positively coupled to each other. In this way, a coupling which has low wear and operates dependably is made possible.

The geometrical conditions of the manufacture of the apparatus are selected in each case so that, upon replacement of the mold, only one degree of freedom, i.e., movement along only a single axis, is permitted. Misdetermination of the geometrical conditions is avoided by, directly before clamping the mold between the clamping plates, transferring the guidance of the mold block to the centering device which is customarily present and the construction and operation of which is known to those of ordinary skill in the art.

The simple guide elements of the present invention, which take up only a small amount of structural space, can be retrofitted onto existing machines. The structural system, which can be manufactured separately, can be installed into existing injection molding machines without interfering with the other structural systems, both in machines with horizontal mold change devices and with vertical mold change devices.

BRIEF DESCRIPTION OF THE DRAWING

The preferred embodiments are shown by way of example in the accompanying drawings in which:

FIG. 4 shows a gripper according to the present invention.

DETAILED DESCRIPTION OF THE PREFERRED EMBODIMENTS

Figure 1:
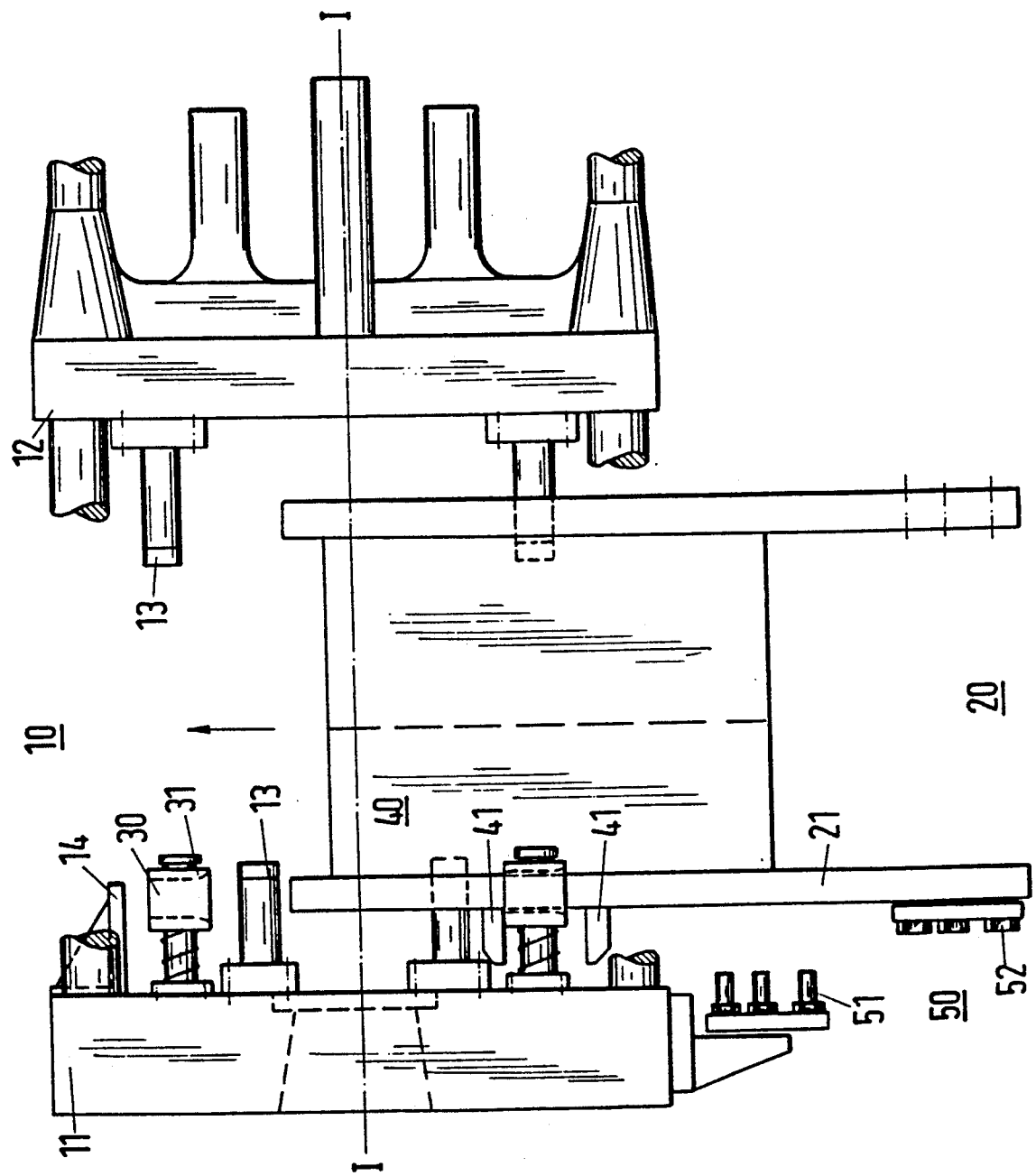
FIG. 1 shows the mold change device of the present invention in open condition.
Figure 3:
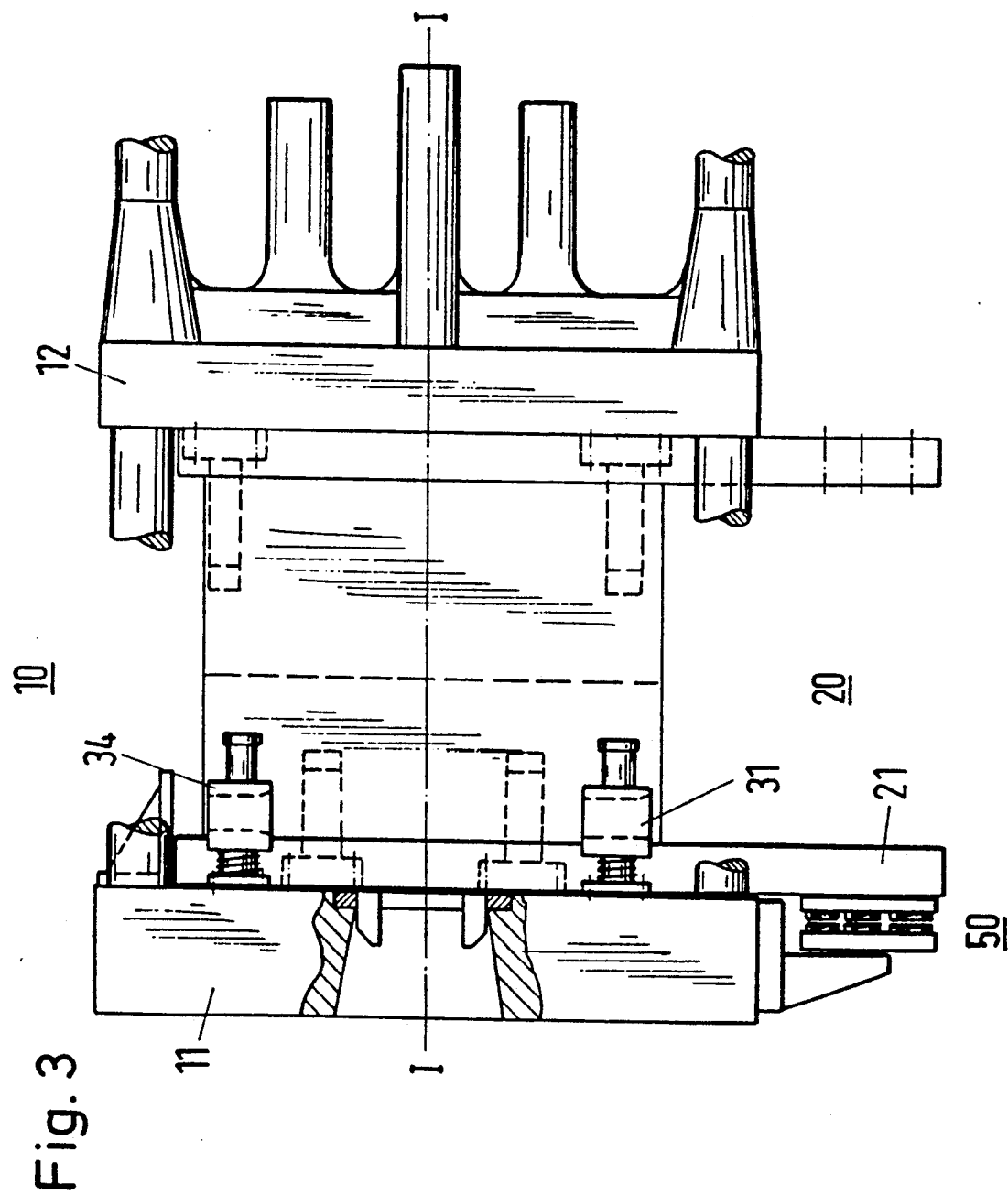
FIG. 3 shows the mold change device of the present invention while in the installed condition.

FIGS. 1 and 3 show a horizontal mold installation in a injection molding machine, which is may be positioned on either side of the machine. FIGS. 1 and 3 each show a top view of the mold and the closing unit of the injection molding machine. A similar system could also be used for vertical installation and removal of the mold.

FIG. 1 shows the insertion of the mold block 20 between the clamping plates 11 and 12 of the injection molding machine. Within the closing unit 10, the mold block 20 is supported from below by the mold resting brackets 13, which are indicated in the drawing. To the side of the fixed clamping plate 11, is shown a power supply coupling 50 which is mounted fixed in position together with installed coupling lugs 51. The supply couplings on the movable clamping plate are not shown in the drawing.

Upon the introduction of the mold block 20, a sufficient clearance distance between the fixed clamping plate 11 and stationary clamping plate 12 must be maintained so that the coupling lugs 51 do not collide with the mating members 52 on the mold block 20 during the introduction procedure. in other words, there must be sufficient clearance to allow free insertion of the mold block 20.

During the insertion of the mold, the resting plate 21 of the mold block 20, which plate faces the stationary clamping plate 11, is threaded into the guide claws 31 of the gripper 30. In this way, a form-lock, i.e. a mechanical interference fit, with the mold plate 20 in the direction of the principal axis I of the machine is produced. Compression springs 33, shown in FIG. 4, between the fixed clamping plate 11 and the guide claws 31 hold the latter in a defined position of insertion.

The mold is inserted into the closing unit 10 until it rests against the bracket 14. The bracket 14 is arranged on the side of the closing unit 10 opposite the insertion side, so that it acts as a stop. On the resting plate 21, there can be noted centering segments 41 which are at a sufficient distance from the fixed clamping plate 11 during the introduction to avoid interference.

Figure 2:
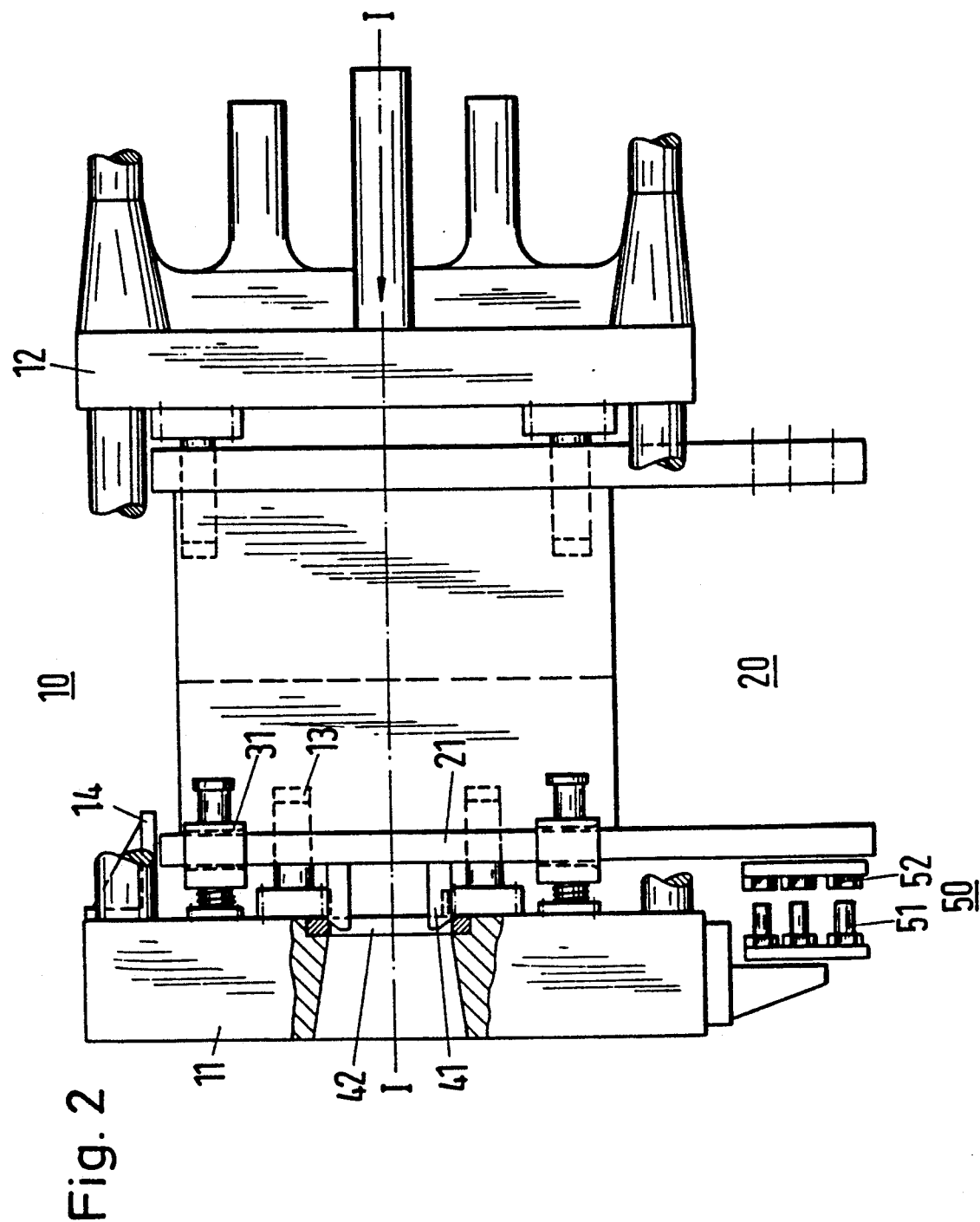
FIG. 2 shows the mold change device of the present invention during the closing operation.

FIG. 2 shows that, during the closing movement of the closing unit 10, a form-lock is present between the guide claws 31 and the mold resting plate 21, at least until the centering segments 41 on the mold block 20 have entered into the centering hole 42 of the machine-side clamping plate 11. An oblique positioning of the mold block 20 with respect to the principal axis I of the machine is thus prevented during the entire closing movement phase of the operation of the device.

Only after the introduction of the centering segments 41, is the form-lock between the guide claws 31 and the mold resting plate 21 terminated. This is performed under positive control due to an inclined axis of movement. The mold block 20, due to its weight, reliably rests on the resting brackets 13.

In FIG. 3 the mold block 20 is shown clamped by the clamping plates 11 and 12. After termination of the form-lock between the guide claw 31 and the mold resting plate 21, the latter can be pushed below the short flanks 38 of the guide claw 31 against the free clamping plate 11, as shown in FIG. 4. If the clamping plates 11, 12 come into contact on both sides, the mold can then be clamped and the installation of the mold is thus complete.

The power supply coupling 50 is coupled during this phase, also under positive control.

The detail view in FIG. 4 shows the stationary clamping plate 11 on which a mounting plate 35 is fastened. A guide bolt 36 is fastened on the mounting plate 35. The position of the bolt 36 is so selected that the axis II of the bolt forms an angle of between about 10° and about 25° with the principal axis I of the machine, the angle facing away from the mold block. A slide piece 37 is provided, which surrounds the bolt 36 and is movable coaxially to the bolt axis II and pressed by a compression spring 33 against the head end of the bolt 36, distal to the mounting plate 35.

The slide piece 37 is provided with a guide claw 31, the flank 34 of which facing away from the clamping plate 11 is longer than the short flank 38 facing the clamping plate 11. The short flank 38 has an end surface 39 which is arranged parallel to the principal axis I of the machine.

The flanks 34 and 38 have introduction bevels 32 by which the introduction of the mold resting plate is facilitated.

It should be understood that the preferred embodiments and examples described are for illustrative purposes only and are not to be construed as limiting the scope of the present invention which is properly delineated only in the appended claims.

What is claimed is:

1. A method for replacing a mold block in an injection molding machine having a central axis and in which the mold block has an outer surface and is movable, substantially parallel to the central axis, between an operating state in which the mold block is clampable in a centered position between a pair of clamping plates comprising a stationary clamping plate and a movable clamping plate, and a replacement state in which the mold block is removable from the machine, comprising the steps of:

substantially restricting free movement of the mold block in two substantially perpendicular restriction axes during installation of the mold block, so as to permit movement of the mold block along only a single axis substantially perpendicular to the two restriction axes, one of said restriction axes being substantially parallel to the central axis;

after said restricting step, gripping the mold block about the mold block outer surface so as to apply gripping forces to the mold block in directions along the central axis for maintaining the mold block in a substantially vertical position;

moving the clamping plates relatively together, no earlier than said gripping step, to clamp the mold block between the clamping plates;

shortly before said clamping of the mold block between the clamping plates, centering the mold block in the centered position between the clamping plates, said gripping step and said centering overlapping in time so that the outer surface of the mold block is simultaneously gripped and the mold block is centered before said clamping by the clamping plates; and, simultaneously vertically guiding the mold block into the centered position during the movement of the clamping plates and the centering of the mold block.

2. The method according to claim 1, wherein the mold block is gripped by a gripper having an axis of movement with respect to one of the clamping plates, further comprising the step of releasing the gripper from the mold block by moving the gripper along the axis of movement in a direction outward from the mold block and toward the one of the clamping plates.

* * * * *